E. B. KUNKLE.
Gage-Cock.
No. 209,816. Patented Nov. 12, 1878.
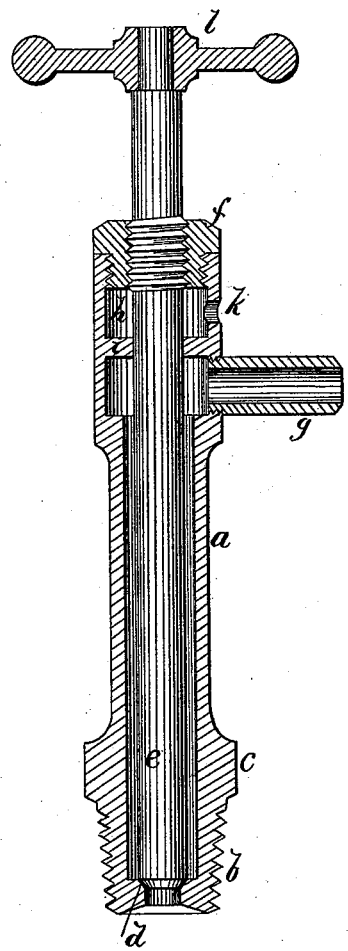
WITNESSES:
INVENTOR:
E. B. Kunkle
BY
ATTORNEYS.

UNITED STATES PATENT OFFICE.

ERASTUS B. KUNKLE, OF FORT WAYNE, INDIANA.

IMPROVEMENT IN GAGE-COCKS.

Specification forming part of Letters Patent No. 209,816, dated November 12, 1878; application filed October 4, 1878.

*To all whom it may concern:*

Be it known that I, ERASTUS B. KUNKLE, of Fort Wayne, in the county of Allen and State of Indiana, have invented a new and Improved Gage-Cock, of which the following is a specification:

My invention relates to an improvement in gage-cocks for steam-boilers; and consists of a tube having its upper end closed by a nut through which the valve-stem passes, and provided with a vacuum-chamber between the said nut and the discharge-pipe, for the purpose of preventing the steam or water from passing through the threads of the nut and scalding the operator, and with a valve-seat at its inner lower end, at the nearest possible point to the boiler, so that no space is left for sediment or scale to collect and clog the opening of the valve.

In the accompanying drawing I have shown a longitudinal section of my improved gage-cock.

The tube or plug $a$ is provided with a thread, $b$, for screwing into the boiler, and is made hectagon at $c$ for the application of a wrench.

$d$ is the seat for the valve, formed at the inner end of the tube $a$, where it passes through the boiler-plate. The valve-stem $e$ closes upon the seat $d$, and is held in place by the nut $f$ at the outer end of the tube $a$, the stem $e$ having a thread formed on its surface, which engages with a female thread in the nut $f$. $l$ is a hand-wheel for operating the valve-stem.

$g$ is the nose-piece of the cock, through which the water or steam is discharged when the cock is opened.

$h$ is a chamber at the outer end of the tube $a$, formed by a partition, $i$, at the inside of the tube, through which partition the valve-stem $e$ passes. The chamber $h$ has an opening, $k$, at one side.

The seat $d$ being at a point close to where the water or steam enters the cock, there is little or no space where sediment or scale may collect, and the cock consequently cannot become clogged, as in cocks where there is a long passage from the boiler to the valve-seat.

The stem may be readily ground to the seat by loosening and freeing the nut $f$ from the tube, which will permit the stem $e$ to be turned independent of the nut.

When the cock is opened any steam or water which passes through the partition $i$ around the valve-stem will pass out of the chamber $h$ by the opening $k$. The chamber $h$ consequently becomes a vacuum-chamber, and the steam and water are kept from passing through the threads of the nut $f$.

Having thus described my invention, I claim as new and desire to secure by Letters Patent—

The gage-cock herein described, consisting of the tube $a$, having its upper end closed by the nut $f$, and provided with the chamber $h$, having the opening $k$, the said chamber being between the said nut and the discharge-pipe or nose $g$, and a valve-seat, $d$, formed at its inner lower end adjacent to the opening in the boiler, in combination with the valve-stem $e$, constructed and arranged substantially as and for the purpose described.

ERASTUS BOICE KUNKLE.

Witnesses:
REUBEN BOSTICK,
JOS. V. LETOT.